United States Patent [19]
Leonard

[11] Patent Number: 5,218,944
[45] Date of Patent: Jun. 15, 1993

[54] FUEL PREHEATING SYSTEM FOR INTERNAL COMBUSTION ENGINES

[76] Inventor: Paul D. Leonard, P.O. Box 456, Cambridge, Ontario, Canada, N1R 5V5

[21] Appl. No.: 966,440

[22] Filed: Oct. 26, 1992

[51] Int. Cl.$^5$ ............................................. F02M 31/00
[52] U.S. Cl. ..................................... 123/557; 123/546; 123/552
[58] Field of Search ................. 123/557, 552, 546, 514

[56] References Cited

U.S. PATENT DOCUMENTS

| | | | |
|---|---|---|---|
| 3,999,525 | 12/1976 | Stumpp et al. | 123/557 |
| 4,343,283 | 8/1982 | Shepherd | 123/557 |
| 4,454,851 | 6/1984 | Bourbonnaud et al. | 123/557 |
| 4,498,525 | 2/1985 | Smith | 123/557 |
| 4,754,741 | 7/1988 | Houtman | 123/557 |
| 4,770,150 | 9/1988 | Fraenkle et al. | 123/557 |
| 4,818,842 | 4/1989 | Walty | 123/557 |
| 5,174,266 | 12/1992 | Evdokimo | 123/557 |

Primary Examiner—E. Rollins Cross
Assistant Examiner—M. Macy
Attorney, Agent, or Firm—R. Craig Armstrong

[57] ABSTRACT

A fuel preheater for use with internal combustion engines is disclosed. The preheater works on the principle that by preheating the fuel, the fuel is more effectively vaporized, resulting in more efficient combustion. This preheating is accomplished using heat normally wasted via the radiator. The preheater has a housing, through which heated engine coolant on its way from the engine block to the radiator is routed. A coiled steel gas line is routed through the housing, and is connected between the regular fuel line and the engine.

6 Claims, 5 Drawing Sheets

FUEL PREHEATING SYSTEM FOR INTERNAL COMBUSTION ENGINES

BACKGROUND OF THE INVENTION

This invention relates to a fuel preheating system for use with internal combustion engines. The invention is best adapted to use with conventional engines using fuel injection, but may also be used with diesel engines.

In any internal combustion engine, fuel is vaporized and mixed with air for combustion. It is known that preheating gasoline or other fuel for internal combustion engines can produce more efficient vaporization and higher combustion efficiency and engine performance than cold fuel. However, preheating the fuel is often not practical because of other problems which may result, such as vapor lock.

Using heat from the engine to preheat the fuel is known. In Canadian patent no. 1,225,888 (Edward L. Nave), for example, a "vapor carburetor" is described, in which a baffled, insulated fuel reservoir holding approximately one litre of fuel is provided. Hot water from the engine block is passed through the fuel reservoir via copper tubing or the like, to preheat the fuel. Air is also drawn into the reservoir to form a fuel/air mixture.

Neither the Nave device nor any other prior art devices known to the inventors provides careful control over the temperature of the fuel, which the inventors have found to be critical to optimum performance.

SUMMARY OF THE INVENTION

This invention operates on the principle that by preheating the fuel to certain ideal temperatures, the fuel is more effectively vaporized, resulting in more efficient combustion.

In the invention, a fuel preheater is employed, preferably but not necessarily of the type having a housing through which heated engine coolant on its way from the engine block to the radiator is routed. A coiled steel gas line is routed through the housing, and is connected between the regular fuel line and the engine. This is substantially as known in the prior art. Other forms of preheating could readily be envisioned and employed, so the invention in its broadest aspect is not restricted to this particular preheater configuration.

It has been discovered by the inventors that there are several narrow optimum fuel temperature bands for any given engine configuration and set of operating conditions (e.g. engine temperature, ambient temperature, etc.). Within any one of the temperature bands, operating efficiency is very substantially greater than even just a few degrees outside the band. However, the bands shift constantly as the operating conditions change, as does the width of the bands, so optimum performance can only be achieved if the temperature of the fuel is constantly adjusted to suit the operating conditions.

Therefore, in the present invention the temperature of the fuel is carefully controlled, by first preheating the fuel and then mixing the preheated fuel with cooled or unheated fuel, to produce the fuel temperature required for optimum performance under the particular operating conditions. Such mixing, in addition to optimizing the temperature of the fuel for the operating conditions, also prevents overheating and vapor lock problems which may result.

Since the optimum temperature bands and their width seem to vary with operating conditions, it is not sufficient to employ a set temperature for the fuel. Therefore, the mixing is controlled to produce the optimum temperature for the operating conditions, by sensing certain operating parameters and regulating the mixing in response to those parameters, as will be explained in greater detail below. Such regulation is preferably carried out under control of a microprocessor, so that the temperature may be constantly regulated to an optimum, as will also be explained in greater detail below.

Further features of the invention will be described or will become apparent in the detailed description which follows.

BRIEF DESCRIPTION OF THE DRAWINGS

The invention will now be described in detail, with reference to the following drawings of the preferred embodiment as an example of the invention.

DETAILED DESCRIPTION OF THE PREFERRED EMBODIMENT

Figure 1:
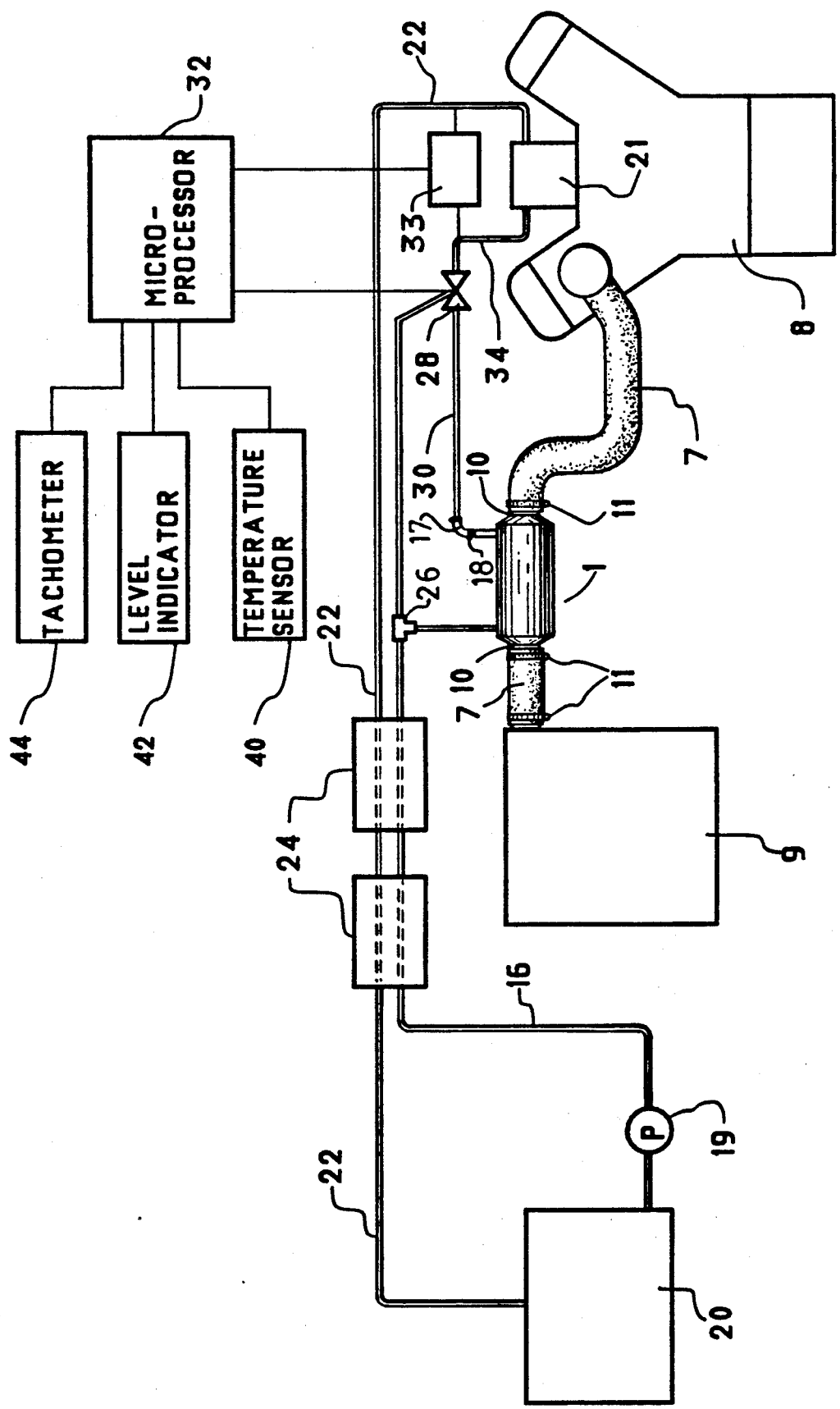
FIG. 1 is a schematic illustration of the preferred system installed in an automobile with a fuel-injected engine, including a fuel preheater.
Figure 2:
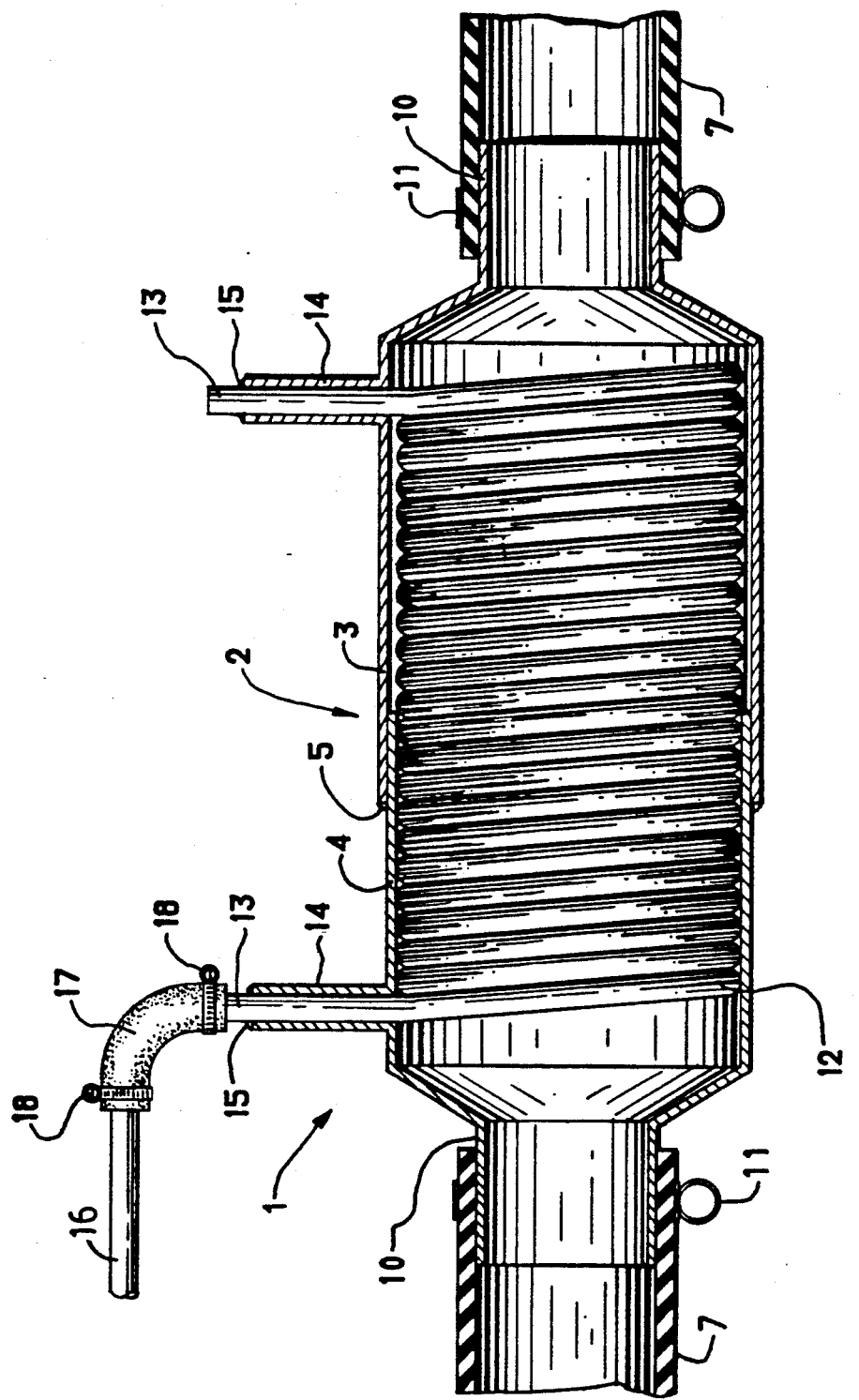
FIG. 2 is a cross-section of the preferred fuel preheater.

FIG. 1 illustrates the overall system in schematic form. A fuel preheater 1, shown in detail in FIG. 2, has a cylindrical housing 2 formed from two cylindrical halves 3 and 4 which are welded to each other at a seam 5. The housing is open at each end for installation in the radiator hose 7 between the engine 8 and radiator 9, each end of the housing having a collar 10 onto which the radiator hose may be clamped by hose clamps 11. Heated coolant thus passes through the housing from the engine to the radiator.

Positioned inside the housing is a coiled steel tube 12 having straight ends 13 which project out beyond the housing through outlets 14. The ends and the outlets are sealed to each other by welds 15, so that coolant cannot leak from the housing.

The coiled tube 12 is connected to the fuel line 16 coming from the gas tank 20 via rubber sleeves 17 and clamps 18.

Preferably, an insulating material (not illustrated) is positioned around the outside of the preheater and fuel lines.

The preheater is manufactured by forming the coil, inserting it in the two housing halves, welding the halves together, welding where the coil ends project from the outlets, and then pressure testing to at least 25 psi.

FIG. 1 shows the system installed in an automobile having a fuel-injected engine. A fuel pump 19 pumps fuel from the gas tank 20, through the fuel line 16, which may be finned for cooling, to a cold exchanger 24 (either a radiator cooler and/or the vehicle air conditioning cooler), to cool the fuel as much as possible, since fuel in the tank may be hotter than desirable if the ambient air is hot. From the cold exchanger, the fuel passes to a tee 26 where fuel is split, one tube leading to the preheater 1 and the other leading to a mixing valve 28. From the preheater, heated fuel is also passed to the mixing valve, via tube 30. The mixing valve is an electronic valve which mixes the preheated fuel with the cooled fuel in the ratio necessary to produce a desired optimum temperature, under control of a microprocessor 32. From the mixing valve, the fuel is passed to the fuel injection manifold or rail 21. This results in a controlled temperature (and pressure, indirectly) at the fuel injectors. If excess pressure does occur in the fuel line it is automatically returned back to the gas tank by a return line 22 via a bypass valve which is presently a standard feature in the fuel injected carburetor.

In the preheater, as the coolant travels through the housing 2, heat is transferred through the steel tube to the fuel. Naturally, if the fuel flow rate increases, the dwell time of the fuel in the housing will be reduced, and the fuel will not be preheated to the same degree. It is preferable that the dwell time be sufficient for the fuel to have sufficient time to reach a moderately high temperature, within the full range of normal fuel flow rates for the engine in question. It therefore follows that for larger engines which use fuel at a greater rate, it is desirable to have a larger housing and a larger coil, in order to ensure sufficient dwell time. The prototype of the preheater, as used on the test vehicles described below, has an inner diameter of 2-⅜ inches and a length of about 5 inches. The steel tube is 3/16 inches (outside diameter) tubing, 12-½ feet long coiled to an outside coil diameter of 2-⅜ inches. Obviously, however, these dimensions could be varied to provide for engines which are larger or smaller than others. The outer diameter of the collar 10 obviously should match the diameter of the radiator hose 7, although if necessary or desirable, an adapter could be used. Similarly, the diameter of the steel tube should correspond to the diameter of the fuel line for the engine in question.

The preheater, without use of a mixing valve and microprocessor to optimize the fuel temperature, has been tested on a 1989 Pontiac GrandAm with 2.5 litre engine and a 1990 Plymouth Acclaim with a 2.5 litre engine. Test results showed that there was a 40% saving on the highway and up to about a 50% saving for the city driving. The engine performed with more power, acting more as if the engine size was larger. Quick response was also noticed when accelerating. The engine temperature was reduced because of the extra heat removed from the coolant. Also, because less fuel was being used, pollution was reduced.

Test results for the preheater were as follows. Tests were conducted on Jan. 20, 1992. Outside temperature was −9° C. Road conditions were wet and bare. Tests were conducted with and without the preheater installed. Test cars were a 1989 GrandAm and 1990 Acclaim, both having 2.5 litre engines with automatic transmissions. Three tests were run to check performance. The first was from 0 to 60 km/hour, measuring the time. The second was from 0 to 60 mph, measuring the time. The third was measuring time and speed to travel 0.5 km from a stand-still position. Results were run over a number of times and averages were taken. Tables 1 and 2 show the results, for the GrandAm and Acclaim respectively.

TABLE 1
Acceleration Tests-1989 GRAND AM

| With Invention: | |
|---|---|
| 0 to 60 km/hr | 6.80 seconds |

TABLE 1-continued
Acceleration Tests-1989 GRAND AM

| 0 to 60 mph | 13.51 seconds |
|---|---|
| 0.5 km speed was 128.3 km/hr | 22.23 seconds |
| Without Invention: | |
| 0 to 60 km/hr | 7.11 seconds |
| 0 to 60 mph | 33.58 seconds |
| 0.5 km speed was 130 km/hr | 23.25 seconds |

TABLE 2
Acceleration Tests-1990 Acclaim

| With Invention: | |
|---|---|
| 0 to 60 km/hr | 7.88 seconds |
| 0 to 60 mph | 16.65 seconds |
| 0.5 km speed was 110 km/hr | 25.34 seconds |
| Without invention: | |
| 0 to 60 km/hr | 7.88 seconds |
| 0 to 60 mph | 17.45 seconds |
| 0.5 km speed was 119 km/hr | 24.99 seconds |

On the same day and road conditions, a city driving test was conducted with and without the invention, at a maximum speed of 60 km/hr. The test route was 35.3 km long and took 50 minutes to complete the test with the invention. It took 52 minutes to complete the test without the invention. The difference in time was due to traffic conditions. The two cars were tested at the same time and same route. Both cars had their gas tanks filled at the start of test so that no more fuel could be added to the tank. The cars were refuelled at the end of the test so that no more fuel could be added to the tanks.

TABLE 3
City Driving Test-1989 Grand AM

| With Invention: | 35.3 km |
|---|---|
| | used 2.15 liters |
| | therefore 16.42 km/1 was obtained |
| Without Invention: | 35.3 km |
| | used 3.86 liters |
| | therefore 9.15 km/1 was obtained |

(Thus 79.5% more fuel was used without the invention than with, or put another way, the engine with the invention used only 45% of the fuel of the engine without the invention.)

TABLE 4
City Driving Test-1990 Acclaim

| With Invention: | 35.3 km |
|---|---|
| | used 2.88 liters |
| | therefore 12.26 km/1 was obtained |
| Without Invention: | 35.3 km |
| | used 5.28 liters |
| | therefore 6.69 km/1 was obtained |

(Thus 83.3% more fuel was used without the invention than with, or put another way, the engine with the invention used only 54.5% of the fuel of the engine without the invention.)

Further testing was conducted on Jan. 21, 1992. The outside temperature was −2° C. Road conditions were wet, bare with small amounts of snow. Highway driving test with invention and without inventions was at a maximum speed of 100 km/hr. The 1990 Acclaim was tested having a 2.5 litre engine with automatic transmission. Car was filled at start of test so that no more fuel could be added to tank. The car was refuelled at the end of test so that no more fuel could be added to tank.

TABLE 5
Highway Driving Test-1990 Acclaim

| With Invention: | 52.8 km travelled |
|---|---|
| | used 2.79 liters |

TABLE 5-continued

Highway Driving Test-1990 Acclaim

| | therefore 18.92 km/1 was obtained |
|---|---|
| Without Invention: | 52.8 km travelled |
| | used 4.65 liters |
| | therefore 11.35 km/1 was obtained |

(Thus 66.7% more fuel was used without the invention than with, or put another way, the engine with the invention used only 60% of the fuel of the engine without the invention.)

Other comments on the above testing are as follows:
1. All tests were conducted with a warm engine.
2. Between testing with invention and without invention, it was noticed that while the invention was connected, the noise of acceleration was less, due to the fact that the engine was being force-fed fuel rather than suction fed.
3. Road conditions were wet causing tires to spin thus making it difficult to take time reading. Therefore, many trials were taken.
4. Method of measuring time was with stopwatch. Method of measuring speed was car's speedometer. Method of measuring distance was car's odometer.

All of the above tests relate strictly to the use of the preheater without controlled mixing to optimize the temperature. However, in subsequent tests under different weather conditions, inconsistent performance was obtained, and it was only then realized, after a good deal of consideration, that there were optimum temperature bands, and that optimum performance could only be achieved consistently if the operating within one of those bands. In some of the early tests, operation within those bands was achieved accidentally, i.e. without realizing the existence and significance of the bands. Further tests led the inventors to realize that although improved performance could be achieved under certain operating conditions using the preheated only, accurate temperature control was critical to achieving optimum performance on a consistent basis under all operating conditions.

Figure 4A:
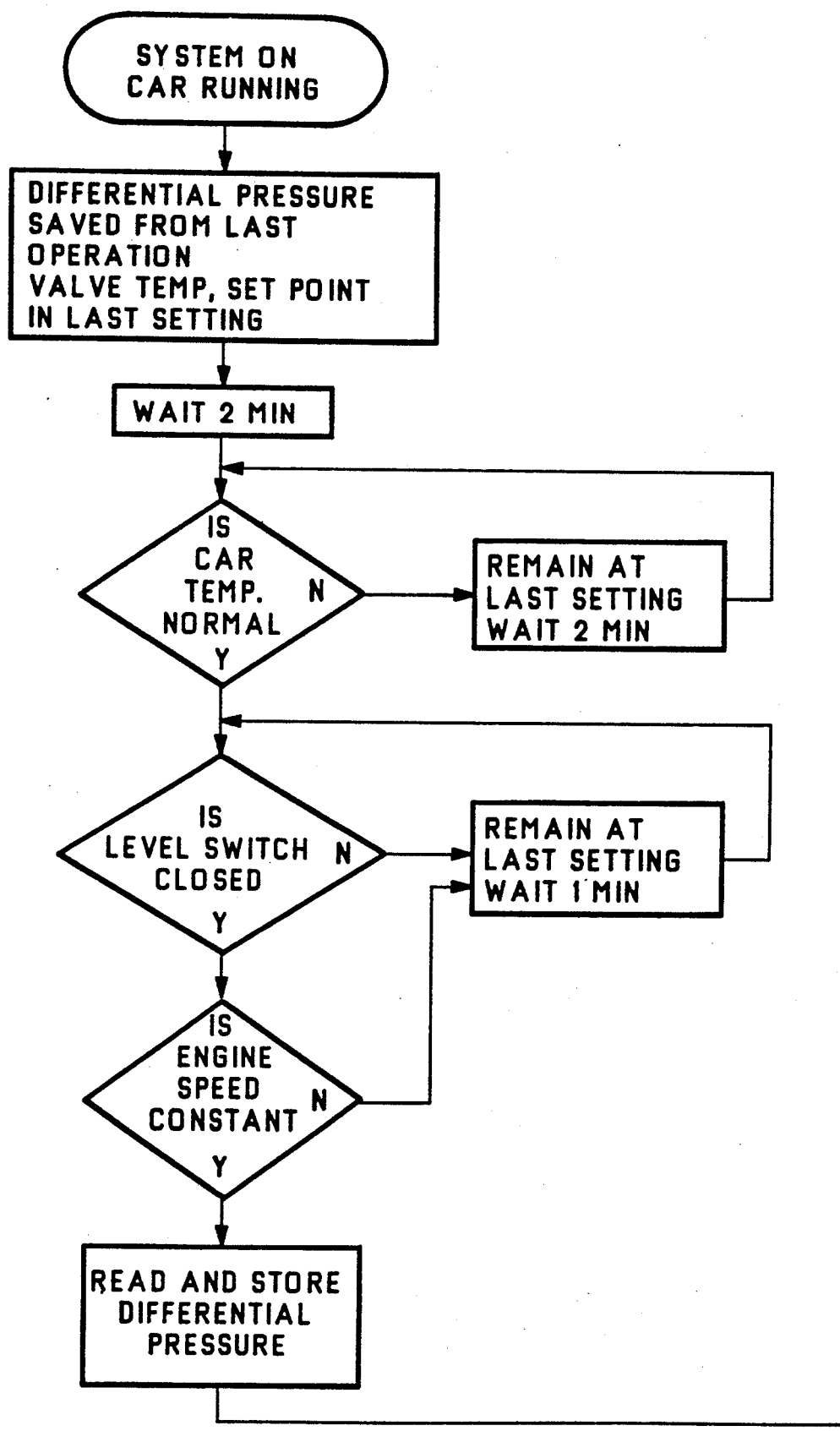
FIGS. 4A and 4B are a flowchart showing the microprocessor control logic.
Figure 4B:
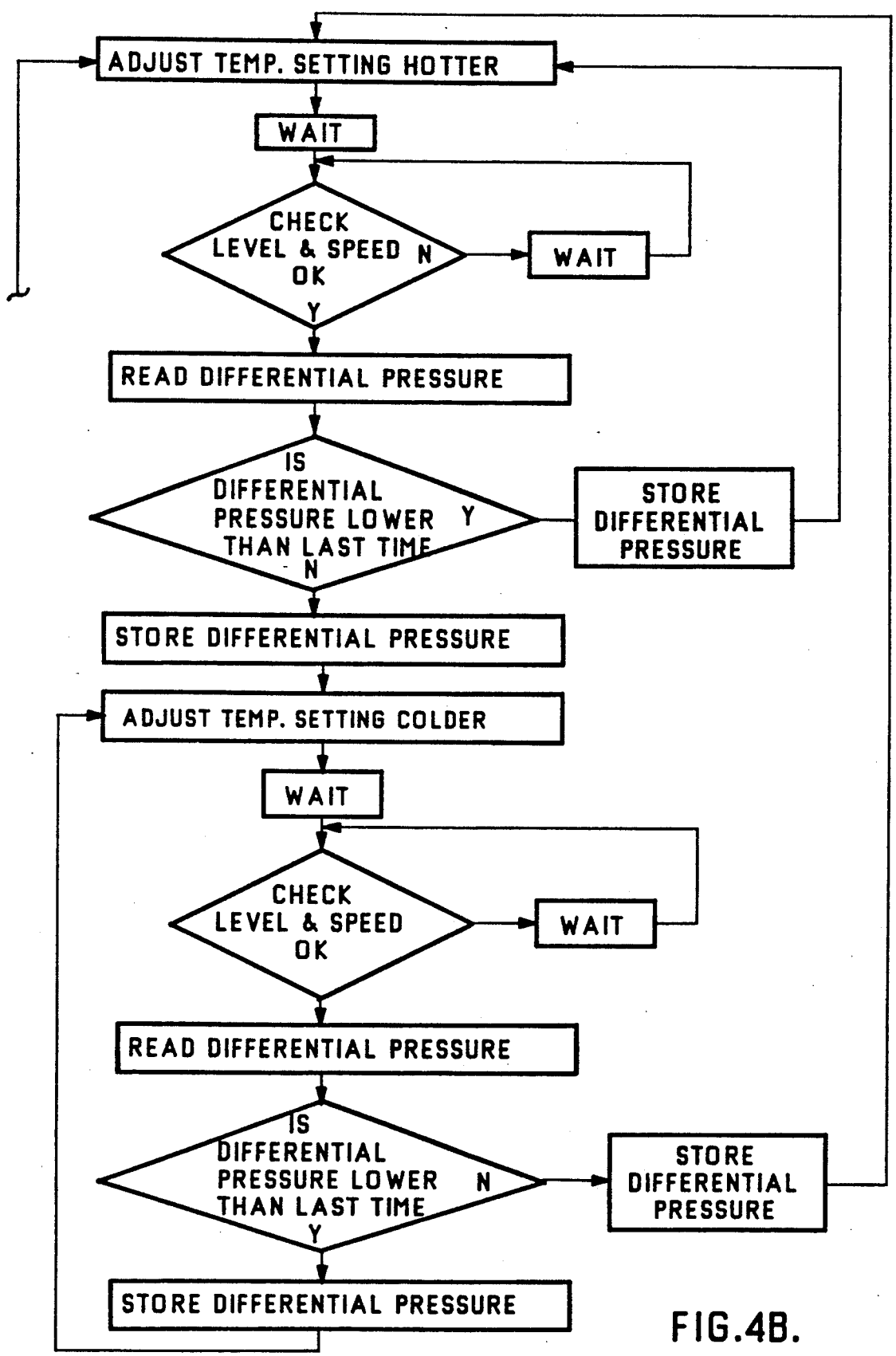

Therefore, the concept of controlled mixing of heated and cooled or unheated fuel was adopted, using the mixing valve 28 controlled by the microprocessor 32. Since the optimum temperature bands vary with engine and operating conditions, the inventors realized that the microprocessor could not produce optimum operation by merely controlling temperature. Therefore, in addition to engine temperature to determine whether or not the engine is up to its normal operating temperature, the microprocessor receives input signals for engine RPM, differential pressure from gauge 33 between the fuel line 34 leading into the injectors and the return line 22, and whether or not the vehicle is level. The temperature of the fuel is adjusted, via the mixing valve, in response to the these parameters. FIG. 4 shows the logic programmed into the microprocessor to achieve this result.

As depicted in FIG. 4, the microprocessor essentially adjusts the temperature, via the mixing valve, to maintain minimum differential pressure, since that indicates that more fuel is being returned to the tank, i.e. that less fuel is being used. With the car running, the system waits two minutes, then reads the engine temperature via temperature sensor 40. If the engine temperature has not yet stabilized, i.e. if the engine is still cold, the system waits two more minutes, and checks again, and so on. Once the temperature has stabilized, the system checks whether the car is level, via a level indicator 42, since the car not being level would affect the fuel demands being made (i.e. uphill demand vs. level demand). If the car is not level, the system waits one minute and checks again, and so on, until the car is level. The system then checks if the engine speed is constant, via a tachometer 44, and if so it stores the differential pressure between the fuel line 34 and the return line 22.

The system then adjusts the valve 28 for a hotter temperature setting, checks level and engine speed, reads the differential pressure again, and then compares the differential pressure with the previous differential pressure and stores the new value. If the differential pressure is lower, the system adjusts the valve for a cooler temperature setting, and then goes through a similar loop to again compare the differential pressure with the previously recorded differential pressure. In this manner, the system is constantly adjusting the temperature to achieve the highest possible differential pressure, and thus the minimum fuel consumption and maximum fuel efficiency.

It should be appreciated that the above description relates to the preferred and alternative embodiments by way of example only. Many variations will be obvious to those who are knowledgeable in the field, and such obvious variations are considered to be within the scope of the invention, whether or not expressly described above.

For example, it should be appreciated that cooling of the fuel coming from the tank may not be necessary in some situations, e.g. where the ambient conditions and/or the tank position or configuration are such that fuel coming from the tank is not particularly warm in any event. Thus, reference to "unheated or cooled fuel" is made in the above description. Nevertheless, although perhaps not strictly essential, cooling of the fuel is certainly preferable in most cases.

Figure 3:
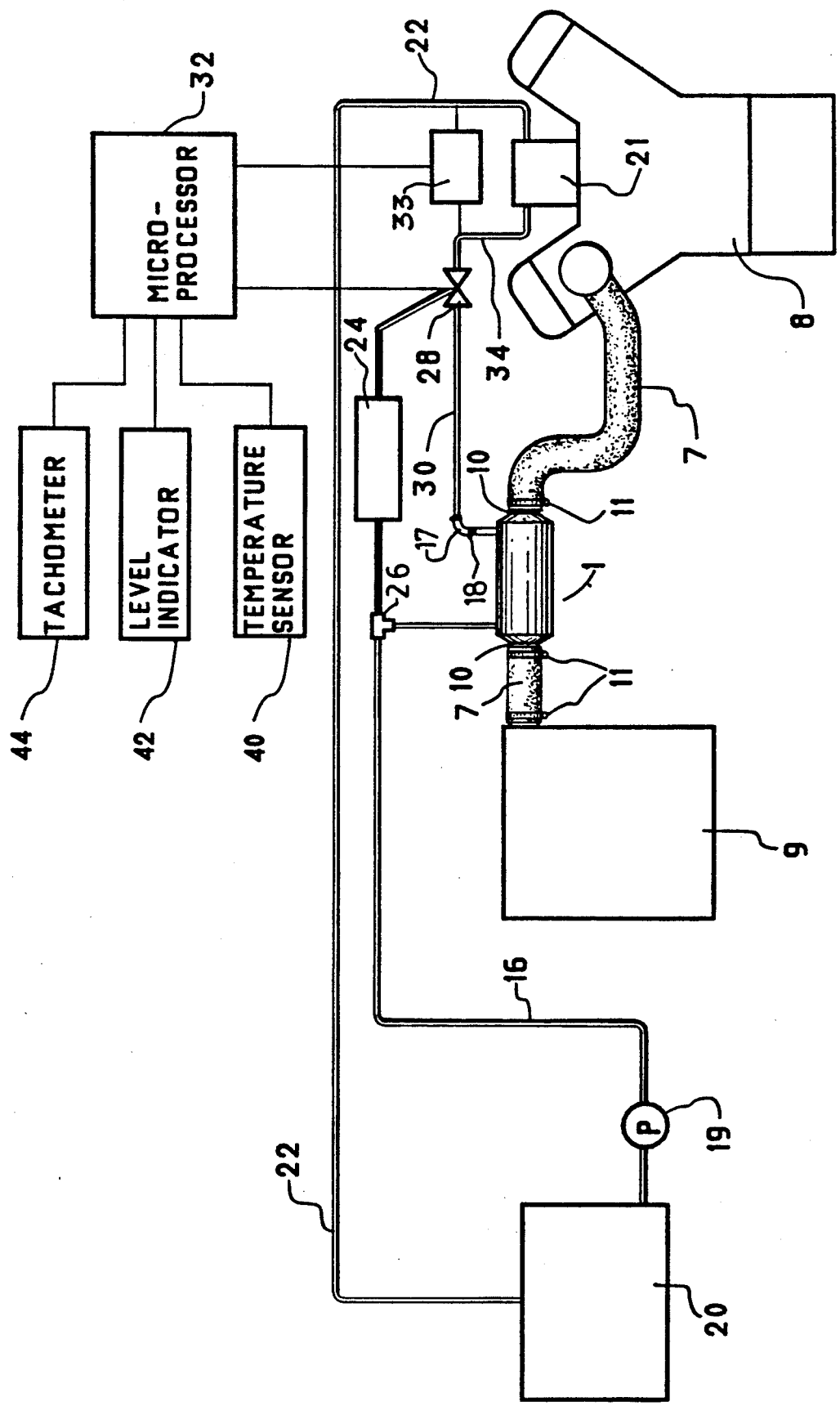
FIG. 3 is a schematic illustration of the system, similar to FIG. 1, but showing a variation of the system in which the fuel is not cooled prior to passing to the preheater.

It should also be appreciated that the location of the cooling could be varied. For example, instead of cooling the fuel prior to routing it to the preheater (as shown in FIG. 1), fuel could be cooled between the tee 26 and the mixing valve 28 as shown in FIG. 3. Thus fuel going to the preheater is not first cooled and then heated.

Also, it should be clear that neither the type nor the precise configuration of preheater illustrated in the drawings need be employed. What is required is some suitable means of preheating the fuel, such as a housing through which heated engine coolant is circulated, with a fuel line passing through that housing, or perhaps some form of electric heating element, with suitable safeguards. The particular arrangement described above is merely one particularly advantageous way of achieving that result, although it should be noted that it will not operate effectively until the coolant is warm enough to produce the desired preheating.

In steady state conditions, i.e. where the apparatus is installed on an engine in a factory, where the operating conditions seldom if ever vary, a manual valve could be used instead of the electronic valve 28.

What is claimed as the invention is:
1. A method of minimizing fuel consumption and thus maximizing fuel efficiency of an engine, comprising the steps of:
   continuously monitoring fuel consumption of the engine under steady state conditions; and
   continuously adjusting the temperature of the fuel leading to the engine to minimize said fuel consumption.

2. A method as recited in claim 1, where said temperature adjustment of said fuel is achieved by first preheating the fuel and then mixing the preheated fuel with cooled or unheated fuel.

3. A method as recited in claim 2, where said mixing is achieved via a mixing valve controlled by a microprocessor, said microprocessor receiving inputs required to determine fuel consumption and the presence of steady state operating conditions.

4. A method as recited in claim 3, where said inputs include engine temperature, engine level, engine RPM, and differential pressure between a fuel line leading to said engine and a return fuel line leading from said engine.

5. A method as recited in claim 4, where said microprocessor, on ignition of the engine:
   waits two minutes, then reads the engine temperature, checking again a short time interval later if said temperature has not yet stabilized, but otherwise then checking the level of the engine, checking again a short time interval later if the car is not level;
   then checking if the engine speed is constant, and if not checking again a short time interval later, but otherwise then storing the differential pressure between said fuel line leading to said engine and said return fuel line;
   then adjusting said mixing valve for different temperature setting, checking level and engine speed, reading said differential pressure again, and then comparing said differential pressure with the previous differential pressure and storing the new value;
   then if the differential pressure is lower, adjusting said mixing valve for a different temperature setting in the opposite direction, or if the differential pressure is higher, adjusting said mixing valve for a different temperature setting in the same direction and then similarly again comparing the differential pressure with the previously recorded differential pressure; thereby constantly adjusting the fuel temperature to achieve the highest possible differential pressure, and thus the minimum fuel consumption and maximum fuel efficiency.

6. A method as recited in claim 2, where said preheating of said fuel is via a fuel preheater, where said engine has a radiator which receives heated coolant from the engine via a radiator hose and where said engine has fuel delivered thereto from a fuel tank via a fuel line, said fuel preheater comprising:
   a housing having a coolant inlet and a coolant outlet connectible to said radiator hose for flow of coolant through said housing, said housing defining a passageway for coolant between said coolant inlet and said coolant outlet;
   a fuel-heating conduit connected in line with said fuel line, and passing through said housing into said passageway and then passing out through said housing.

* * * * *